United States Patent [19]

Shimizu et al.

[11] Patent Number: 5,292,790

[45] Date of Patent: Mar. 8, 1994

[54] CONJUGATED DIENE SERIES RUBBER COMPOSITIONS

[75] Inventors: Takashi Shimizu, Hachioji; Takashi Kitamura, Musashimurayama; Ryota Fujio, Akigawa, all of Japan

[73] Assignee: Bridgestone Corporation, Tokyo, Japan

[21] Appl. No.: 921,257

[22] Filed: Jul. 29, 1992

[30] Foreign Application Priority Data

Jul. 31, 1991 [JP] Japan .................. 3-213232

[51] Int. Cl.$^5$ .............................. C08K 3/04
[52] U.S. Cl. .................. 524/496; 525/123; 525/153
[58] Field of Search .............. 524/496; 525/123, 153

[56] References Cited

U.S. PATENT DOCUMENTS 4,670,502 6/1987 Hargis et al. .............. 524/526
5,017,636 5/1991 Hattori et al. .............. 524/526

FOREIGN PATENT DOCUMENTS 0058217 8/1982 European Pat. Off.
1426998 11/1964 France.
63-297410 12/1988 Japan.
64-070541 3/1989 Japan.

OTHER PUBLICATIONS

Plasdor–Central Patents Index—Basic Abstracts Journal for JP-A-2-105837.

Primary Examiner—Paul R. Michl
Assistant Examiner—Edward Cain
Attorney, Agent, or Firm—Sughrue, Mion, Zinn, Macpeak & Seas

[57] ABSTRACT

A conjugated diene series rubber composition comprises 100 parts by weight of a diene series rubber containing at least 30 parts by weight of a particular modified styrene-butadiene copolymer rubber, and 30–80 parts by weight of a specified carbon black, and is excellent in strength at breakage, abrasion resistance and low fuel consumption after vulcanization.

8 Claims, No Drawings

CONJUGATED DIENE SERIES RUBBER COMPOSITIONS

BACKGROUND OF THE INVENTION

1. Field of the Invention

This invention relates to a conjugated diene series rubber composition having improved strength at breakage, abrasion resistance and low heat build-up after vulcanization.

2. Description of the Related Art

Lately, the demand on safeness and low fuel consumption of automobiles becomes more severer and hence the rubber material for automobile tire is strongly demanded to have an abrasion resistance in addition to the safeness and low fuel consumption. Heretofore, the rubber composition containing styrene-butadiene copolymer rubber obtained by emulsion polymerization process (E-SBR) has widely been used as a tread for the tire owing to the excellent abrasion resistance. However, the rubber composition containing E-SBR is large in the energy loss and is apt to generate heat, so that it is unsuitable for treads directing to the low fuel consumption.

In order to solve this problem, there are used rubber compositions containing styrene-butadiene copolymer rubber obtained by solution polymerization process (S-SBR). S-SBR is obtained by copolymerizing butadiene with styrene in a hydrocarbon solvent in the presence of an organolithium initiator and has a narrow molecular weight distribution. That is, S-SBR does not contain low molecular weight component as compared with E-SBR and is small in the hystresis loss, so that it is suitable for the tread directing to the low fuel consumption.

Furthermore, as disclosed in Japanese Patent Application Publication No. 44-4996, Japanese Patent laid open No. 57-205414 and U.S. Pat. No. 3,956,232, terminal-modified S-SBR can be obtained by utilizing an activity of terminal group in S-SBR after the polymerization and reacting it with a halogenated tin compound or an alkenyl tin compound. When such a terminal-modified S-SBR is compounded with carbon black and the like, the resulting rubber composition provides considerably low heat build-up or low fuel consumption.

However, such S-SBRs are low in the heat build-up or fuel consumption but are poor in the strength and abrasion resistance as compared with E-SBR as a rubber composition, so that it is difficult to synthesize S-SBR simultaneously satisfying low fuel consumption and excellent abrasion resistance.

SUMMARY OF THE INVENTION

It is, therefore, an object of the invention to solve the aforementioned problems of the conventional technique and to provide a conjugated diene series rubber composition having low heat build-up and improved strength at breakage and abrasion resistance after vulcanization.

According to the invention, there is the provision of a conjugated diene series rubber composition comprising 100 parts by weight of a diene series rubber containing at least 30 parts by weight of a modified styrene-butadiene copolymer rubber (modified S-SBR) obtained by copolymerizing 1,3-butadiene and styrene at a weight ratio of 80:20–50:50 in a hydrocarbon solvent in the coexistence of an organolithium compound as an initiator and 0.01–0.3 mol per 1 gram equivalent of the organolithium compound of at least one alkali metal compound selected from alkali metal compounds represented by the following general formulae:

$$R^1M, R^2OM, R^3COOM \text{ and } R^4R^5NM$$

(wherein each of $R^1$, $R^2$, $R^3$, $R^4$ and $R^5$ is an alkyl group, a cycloalkyl group, an alkenyl group, an aryl group or a partially substituted group thereof, and M is Na, K, Rb or Cs) and then modifying an active terminal of the resulting copolymer with a modifier, and 30–80 parts by weight of carbon black having a specific surface area of nitrogen adsorption of not less than 70 $m^2/g$ and a dibutyl phthalate (DBP) absorption of 70–150 ml/100 g.

DESCRIPTION OF THE PREFERRED EMBODIMENTS

The invention provides a conjugated diene series rubber composition comprising a modified S-SBR produced under the above conditions, other diene series rubber and a reinforcing carbon black as an essential component, which is excellent in the abrasion resistance and low fuel consumption as a tread material for the tire.

According to the invention, S-SBR is first produced by copolymerizing 1,3-butadiene and styrene at a weight ratio of 80:20–50:50 in the presence of at least one of the above alkali metal compounds with the organolithium initiator in the hydrocarbon solvent. When the amount of styrene is less than 20% by weight, the abrasion resistance is poor, while when it exceeds 50% by weight, the heat build-up increases to degrade the low fuel consumption, so that the amount of styrene is limited to a range of 20–50% by weight. Under such polymerization conditions, microblocks having not less than 4 but not more than 10 chain length units are not less than 20% by weight of total styrene amount.

As the organolithium compound used as a polymerization initiator, mention may be made of an alkyllithium such as ethyllithium, propyllithium, n-butyllithium, sec-butyllithium, tert-butyllithium or the like; an aryllithium such as phenyllithium, tolyllithium or the like; an alkenyllithium such as vinyllithium, propenyllithium or the like; an alkylene dilithium such as tetramethylene dilithium, pentamethylene dilithium, decamethylene dilithium or the like; an arylene dilithium such as 1,3-dilithiobenzene, 1,4-dilithiobenzene or the like; 1,3,5-trilithio cyclohexane, 1,2,5-trilithio naphthalene and so on. Preferably, the alkyllithium, more particularly n-butyllithium is used.

The amount of the organolithium initiator used is determined by the molecular weight of the copolymer to be produced, but it is usually 0.05–4.0 milligram atom, preferably 0.1–2.0 milligram atom as a lithium atom per 100 g of the monomer.

As the alkali metal compound of $R^1M$, mention may be made of methylsodium, ethylpotassium, n-propylrubidium, ethylcesium, t-butylsodium, t-amylpotassium, n-hexylrubidium, 4-methylcyclohexylsodium, 3-hexenylpotassium, 2,5-decadienylrubidium, 4,6-di-n-butyldeccylsodium, phenylpotassium, benzylsodium, 4-tolylpotassium and the like.

As the alkali metal compound of $R^2OM$, mention may be made of alkali metal salts of monovalent and polyvalent alcohols and monovalent and polyvalent phenols, such as sodium, potassium, rubidium or cesium sals of methyl alcohol, ethyl alcohol, n-propyl alcohol, isopropyl alcohol, t-butyl alcohol, t-amyl alcohol, n- hexyl alcohol, cyclohexyl alcohol, 2-butenyl alcohol, 4-methylcyclohexenyl alcohol, 3-cyclopentenyl alcohol, 3-hexenyl alcohol, 2,5-decadienyl alcohol, allyl alcohol, 1,3-dihydrohexane, 1,5,9-trihydroxytridecane, benzyl alcohol, phenol, catechol, resorcinol, hydroquinone, pyrogallol, 1-naphthol, 2-naphthol, 2,6-di-t-butyl-4-methylphenol, 2,4,6-tri-t-butylphenol, n-nonylphenol, 1,12-dodecane diol and the like.

As the alkali metal compound of $R^3COOM$, mention may be made of alkali metal salts of mono- and polycarboxylic acids such as sodium, potassium, rubidium or cesium salts of lauric acid, myristic acid, palmitic acid, stearic acid, arachic acid, linoleic acid, linolenic acid, phenylacetic acid, benzoic acid, sebacic acid, phthalic acid, 1,8,16-hexadecanetolyl carboxylic acid and the like.

As the alkali metal compound of $R^4R^5NM$, mention may be made of alkali metal salrs of secondary amines such as sodium, potassium, rubidium or cesium salts of dimethylamine, di-n-butylamine, methyl-n-hexylamine, di(3-hexenyl)amine, diphenylamine, dibenzylamine and the like.

At least one of the above alkali metal compounds is used in an amount of 0.01–0.3 mol per 1 gram equivalent as lithium of the organolithium initiator in the copolymerization of styrene and butadiene. When the amount of the alkali metal compound is less than 0.01 mol per 1 gram equivalent of lithium, it is difficult to obtain random SBR, while when it exceeds 0.3 mol, the polymerization activity undesirably lowers.

As the hydrocarbon solvent, use may be made of any solvents stable against the organolithium initiator, which includes pentane, hexane, heptane, cyclohexane, methylcyclohexane, benzene, toluene, xylene and a mixture thereof.

After the copolymerization, the terminal of the resulting SBR is modified by adding a modifier as mentioned below, whereby there can be provided a rubber composition having considerably improved strength, abrasion resistance, low fuel consumption and the like.

As the modifier, mention may be made of halogenated tin compounds such as tin tetrachloride, diethyldichloro tin, dibutyldichloro tin, tributyl tin chloride, diphenyldichloro tin, triphenyl tin chloride and the like; phenyl isocyanate, 2,4-tolylene diisocyanate, 2,6-tolylene diisocyanate, diphenylmethane diisocyanate, naphthalene diisocyanate and aromatic polyisocyanate compounds such as dimer and trimer thereof; N,N'-dimethylamino benzophenone, N,N'-diethylamino benzophenone, N-dimethylamino benzaldehyde, N-diethylamino benzaldehyde, 1,3-dimethyl-2-imidazolidinone, 1,3-diethyl-2-imidazolidinone, N-methylacrylamide, tetramethyl urea, N-methyl-2-pyrrolidone, N-methyl-ε-caprolactum, dimethylcarbodiimide, dipropylcarbodiimide, dibutylcarbodiimide, dicyclohexyl carbodiimide, diphenylcarbodiimide, benzaldehyde-N,N-dimetyl hydrazone, benzaldehyde-N,N-diphenyl hydrazone, p-methylbenzaldehyde-N,N-dimethyl hydrazone, p-(N,N-dimethylamoni)benzaldehyde-N,N-dimethyl hydrazone and so on.

The rubber composition according to the invention comprises at least 30 parts by weight of the above modified styrene-butadiene copolymer rubber (modified S-SBR) and the balance being a diene series rubber other than the modified S-SBR such as natural rubber, synthetic polyisoprene rubber, E-SBR, polybutadiene rubber or the like or a blend thereof as a rubber component. When the amount of the modified S-SBR is less than 30 parts by weight per 100 parts by weight of the rubber component, the effect of improving the properties of the rubber composition after vulcanization is less.

As the carbon black to be compounded with the above rubber component, use may be made of carbon black HAF, ISAF and SAF having a specific surface area of nitrogen adsorption (ASTM D3037) of not less than 70 m$^2$/g and a dibutyl phthalate (DBP) absorption (ASTM D2414) of 70-150 ml/100 g. In these carbon blacks, when the specific surface area of nitrogen adsorption is less than 70 m$^2$/g, the strength and abrasion resistance of the vulcanizate are undesirably poor. When the DBP absorption is less than 70 ml/100 g, the abrasion resistance of the vulcanizate is not sufficient, while when it exceeds 150 ml/100 g, the fuel consumption is undesirably poor. Such a carbon black is compounded in an amount of 30–80 parts by weight based on 100 parts by weight of the rubber component. When the amount of the carbon black is less than 30 parts by weight, the strength and abrasion resistance are poor, while when it exceeds 80 parts by weight, the heat build-up increases and the durability and low fuel consumption are degraded.

If necessary, the conjugated diene series rubber composition according to the invention may be used by treating with an oiling agent such as high aromatic content process oil, naphthenic process oil or the like.

The following examples are given in illustration of the invention and are not intended as limitations thereof. In these examples, part and % are by weight otherwise specified.

Various measurements in these examples were made as follows.

The molecular weight was determined as a standard of polystyrene by measuring a weight average molecular weight of the diene series polymer before the reaction with the modifier by means of a gel permeation chromatography (GPC).

The microstructure of the diene portion was measured according to an infrared spectroscopy (Molero's method). The bound styrene content was determined from an absorption intensity of aromatic proton in a nuclear magnetic resonance spectrum (NMR).

The strength at breakage was evaluated by a tensile strength according to a method of JIS K6301. The strength at high temperature was evaluated by a tensile strength measured at 100° C. according to a method of JIS K6301.

As an evaluation of the low fuel consumption, dynamic loss factor at 50° C. (tan δ) and dependency of tan δ upon strain (Δtan δ = tan δmax − tan δ1% strain) were measured by means of a viscoelastometer (the smaller the value, the better the fuel consumption).

The abrasion resistance was measured by means of a Lambourn abrasion tester and represented by an index on the basis that the value at a constant slip ratio in Comparative Example 1 or 3 was 100.

Polymers A to F used in the examples and comparative examples were produced by the following methods.

Polymers Used in Examples

Polymer A:

Into a pressure vessel of 2 liters provided with a stirrer and a heating jacket was previously charged 1000 g of cyclohexane containing 12 wt % of butadiene therein and further 80 g of styrene was added to prepare a monomer solution. Then, 0.01 g of t-butoxypotassium (t-BuOK) as an alkali metal compound and 0.11 g of n-butyllithium as an organolithium initiator were added to start polymerization. The polymerization was continued at about 50° C. for about 3 hours. Thereafter, 0.13 g of tin tetrachloride (SnCl$_4$) as a modifier was added and the reaction was further continued for 2 hours to modify the terminal of the polymer. Then, the removal of solvent and the drying were conducted in usual manner to obtain a styrene-butadiene copolymer as a polymer A.

Polymer B:

A styrene-butadiene copolymer as a polymer B was obtained in the same manner as in the polymer A except that 0.3 g of dibutyltin dichloride (Bu$_2$SnCl$_2$) was added instead of tin tetrachloride as a modifier.

Polymer C:

After the polymerization was conducted in the same manner as in the polymer A, 0.2 g of 1,3-dimethyl-2-imidalidinone (DMI) was added instead of tin tetrachloride as a modifier and the reaction was further continued for 2 hours to modify the terminal of the polymer and stopped with isopropyl alcohol and then the solvent removal and drying were conducted in usual manner to obtain a styrene-butadiene copolymer as a polymer C.

Polymer D:

After the polymerization was conducted in the same manner as in the polymer A except that 0.025 g of nonylphenoxy potassium wa added instead of t-butoxypotassium as an alkali metal compound, 0.13 g of tin tetrachloride was added as a modifier and the reaction was further continued for 2 hours to modify the terminal of the polymer and then the solvent removal and drying were conducted in usual manner to obtain a styrene-butadiene copolymer as a polymer D.

Polymers Used in Comparative Examples

Polymer E:

Into a pressure vessel of 2 liters provided with a stirrer and a heating jacket was previously charged 1000 g of cyclohexane containing 12 wt % of butadiene therein and further 80 g of styrene was added to prepare a monomer solution. Then, 2.0 g of tetrahydrofuran and 0.11 g of n-butyllithium as an organolithium initiator were added to start polymerization. The polymerization was continued at about 50° C. for about 3 hours. Thereafter, the reaction was stopped with isopropyl alcohol and the solvent removal and drying were conducted in usual manner to obtain a styrene-butadiene copolymer as a polymer E.

Polymer F:

After the polymerization was conducted in the same manner as in the polymer A, the reaction was stopped with isopropyl alcohol without modification reaction and then the solvent removal and drying were conducted in usual manner to obtain a styrene-butadiene copolymer as a polymer F.

The molecular weight and microstructure of each synthesized polymer are shown in Table 1.

TABLE 1

| Polymer | Alkali metal compound | Modifier | Molecular weight | | Microstructure | | | |
|---|---|---|---|---|---|---|---|---|
| | | | Mn | Mw/Mn | cis | trans | vinyl | styrene |
| A | t-BuOK | SnCl$_4$ | 16 × 10$^4$ | 1.39 | 38 | 45 | 17 | 41 |
| B | t-BuOK | Bu$_2$SnCl$_2$ | 17 × 10$^4$ | 1.41 | 39 | 44 | 17 | 40 |
| C | t-BuOK | DMI | 15 × 10$^4$ | 1.35 | 38 | 44 | 18 | 40 |
| D | 1) | SnCl$_4$ | 17 × 10$^4$ | 1.38 | 38 | 45 | 17 | 39 |
| E | — | — | 22 × 10$^4$ | 1.10 | 27 | 38 | 35 | 40 |
| F | — | — | 16 × 10$^4$ | 1.40 | 38 | 45 | 17 | 41 |

1) nonylphenoxy potassium

In Table 1, each of cis, trans and vinyl contents are represented by a ratio to butadiene portion, and the molecular weight is represented by a value converted into polystyrene.

Each of the polymers A to F was kneaded with other components according to a compounding recipe shown in Table 2 to obtain a rubber composition for Examples 1–4 and Comparative Examples 1–2. After these rubber compositions were vulcanized at 145° C. for 33 minutes, the properties of the vulcanizates were measured to obtain results as shown in Table 3.

TABLE 2

| | (part by weight) |
|---|---|
| Polymer | 100 |
| Carbon black HAF | 50 |
| Aromatic oil | 10 |
| Stearic acid | 2 |
| Antioxidant 6C 1) | 1 |
| Zinc white | 3 |
| Antioxidant TP 2) | 0.8 |
| Vulcanization accelerator DPG 3) | 0.6 |
| Vulcanization accelerator DM 4) | 1.2 |
| Sulfur | 1.5 |

1) N-Phenyl-N'-(1,3-dimethylbutyl)-p-phenylenediamine
2) Mixed diaryl-p-phenylenediamine
3) 1,3-Diphenylguanidine
4) Dibenzothiazyl disulfide As seen from Table 3, the vulcanizates of the conjugated diene series rubber compositions in Examples 1 to 4 are high in the elongation (%) and tensile strength and small in tan δ and large in Lambourn index as abrasion resistance as compared with the vulcanizates of the conjugated diene series rubber compositions in Comparative

TABLE 3

| | Sample | parts | Elongation (%) room temperature | Tensile strength (kgf/cm$^2$) | | tan δ 50° C. | | Resistance to Lambourn abrasion Index |
|---|---|---|---|---|---|---|---|---|
| | | | | room temperature | 100° C. | 1% strain | Δtan δ | |
| Example 1 | Polymer A | 100 | 440 | 305 | 140 | 0.120 | 0.032 | 150 |
| Example 2 | Polymer B | 100 | 435 | 298 | 138 | 0.118 | 0.029 | 146 |
| Example 3 | Polymer C | 100 | 432 | 288 | 135 | 0.128 | 0.037 | 143 |
| Example 4 | Polymer D | 100 | 438 | 301 | 138 | 0.122 | 0.033 | 148 |
| Comparative Example 1 | Polymer E | 100 | 395 | 245 | 117 | 0.138 | 0.076 | 100 |

TABLE 3-continued

|  | Sample | parts | Elongation (%) room temperature | Tensile strength (kgf/cm²) room temperature | 100° C. | tan δ 50° C. 1% strain | Δtan δ | Resistance to Lambourn abrasion Index |
|---|---|---|---|---|---|---|---|---|
| Comparative Example 2 | Polymer F | 100 | 425 | 268 | 128 | 0.165 | 0.085 | 132 |

That is, the rubber compositions according to the invention have high strength at breakage, large abrasion resistance and low heat build-up.

Further, the polymer A was kneaded with a given amount of natural rubber (NR) as another diene series rubber according to the compounding recipe of Table 2 to obtain rubber compositions for Examples 5 and 6 and Comparative Example 3. After these rubber compositions were vulcanized at 145° C. for 33 minutes, the properties of the resulting vulcanizates were measured to obtain results as shown in Table 4.

As seen from Table 4, as the amount of NR increases, the value of tan δ becomes large to degrade

TABLE 4

|  | Sample | parts | NR parts | Elongation (%) room temperature | Tensile strength (kgf/cm²) room temperature | 100° C. | tan δ 50° C. 1% strain | Δtan δ | Resistance to Lambourn abrasion Index |
|---|---|---|---|---|---|---|---|---|---|
| Example 5 | Polymer A | 80 | 20 | 456 | 291 | 143 | 0.124 | 0.042 | 110 |
| Example 6 | Polymer A | 40 | 60 | 468 | 295 | 162 | 0.129 | 0.059 | 108 |
| Comparative Example 3 | Polymer A | 20 | 80 | 470 | 295 | 178 | 0.132 | 0.086 | 100 |

As mentioned above, the conjugated diene series rubber compositions according to the invention are excellent in the strength at breakage, abrasion resistance and low fuel consumption after the vulcanization, so that they can usefully be used as a rubber composition for tire tread.

What is claimed is:

1. A conjugated diene series rubber composition comprising 100 parts by weight of a diene series rubber containing at least 30 parts by weight of a modified styrene-butadiene copolymer rubber (modified S-SBR) obtained by copolymerizing 1,3-butadiene and styrene at a weight ratio of 80:20–50:50 in a hydrocarbon solvent in the coexistence of an organolithium compound as an initiator and 0.01–0.3 mol per 1 gram equivalent of the organolithium compound of at least one alkali metal compound selected from alkali metal compounds represented by the following general formulae:

$R^1M$, $R^2OM$, $R^3COOM$ and $R^4R^5NM$ (wherein each of $R^1$, $R^2$, $R^3$, $R^4$ and $R^5$ is an akly group, a cycloalkyl group, an alkenyl group, an aryl group or a partially substituted group thereof, and M is Na, K, Rb or Cs) and then modifying an active terminal of the resulting copolymer with a modifier, and 30–80 parts by weight of carbon black having a specific surface area of nitrogen adsorption of not less than 70 m²/g and a dibutyl phthalate absorption of 70–150 ml/100 g.

2. The conjugated diene series rubber composition according to claim 1, wherein said organolithium initiator is selected from the group consisting of ethyllithium, propyllithium, n-butyllithium, sec-butyllithium, tert-butyllithium, phenyllithium, tolyllithium, vinyllithium, propenyllithium, tetramethylene dilithium, pentamethylene dilithium, decamethylene dilithium, 1,3-dilithiobenzene, 1,4-dilithiobenzene, 1,3,5-trilithio cyclohexane and 1,2,5-trilithio naphthalene.

3. The conjugated diene series rubber composition according to claim 1, wherein said organolithium initiator is used in an amount of 0.05–4.0 milligram atom as a lithium atom per 100 g of said monomer.

4. The conjugated diene series rubber composition according to claim 1, wherein said alkali metal compound of the general formula $R^1M$ is selected from methyl-sodium, ethylpotassium, n-propylrubidium, ethylcesium, t-butylsodium, t-amylpotassium, n-hexylrubidium, 4-methylcyclohexylsodium, 3-hexenylpotassium, 2,5-decadienylrubidium, 4,6-di-n-butyldeccylsodium, phenylpotassium, benzylsodium and 4-tolylpotassium.

5. The conjugated diene series rubber composition according to claim 1, wherein said alkali metal compound of the general formula $R^2OM$ is selected from sodium, potassium, rubidium or cesium sals of methyl alcohol, ethyl alcohol, n-propyl alcohol, isopropyl alcohol, t-butyl alcohol, t-amyl alcohol, n-hexyl alcohol, cyclohexyl alcohol, 2-butenyl alcohol, 4-methylcyclohexenyl alcohol, 3-cyclopentenyl alcohol, 3-hexenyl alcohol, 2,5- 0 decadienyl alcohol, allyl alcohol, 1,3-dihydrohexane, 1,5,9-trihydroxytridecane, benzyl alcohol, phenol, catechol, resorcinol, hydroquinone, pyrogallol, 1-naphthol, 2-naphthol, 2,6-di-t-butyl-4-methylphenol, 2,4,6-tri-t-butylphenol, n-nonylphenol and 1,12-dodecane diol.

6. The conjugated diene series rubber composition according to claim 1, wherein said alkali metal compound of the general formula $R^3COOM$ is selected from sodium, potassium, rubidium or cesium salts of lauric acid, myristic acid, palmitic acid, stearic acid, arachic acid, linoleic acid, linolenic acid, phenylacetic acid, benzoic acid, sebacic acid, phthalic acid and 1,8,16- o hexadecanetolyl carboxylic acid.

7. The conjugated diene series rubber composition according to claim 1, wherein said alkali metal compound of the general formula $R^4R^5NM$ is selected from sodium, potassium, rubidium or cesium salts of dimethylamine, di-n-butylamine, methyl-n-hexylamine, di(3-hexenyl)amine, diphenylamine and dibenzylamine.

8. The conjugated diene series rubber composition according to claim 1, wherein said modifier is selected from the group consisting of tin tetrachloride, diethyldichloro tin, dibutyldichloro tin, tributyl tin chloride, diphenyldichloro tin, triphenyl tin chloride, phenyl isocyanate, 2,4-tolylene diisocyanate, 2,6-tolylene diisocyanate, diphenylmethane diisocyanate, naphthalene diisocyanate, dimer and trimer of these isocyanate, N,N'-dimethylamino benzophenone, N,N'-diethylamino benzophenone, N-dimethylamino benzaldehyde, N-diethylamino benzaldehyde, 1,3-dimethyl-2-imidazolidinone, 1,3-diethyl-2-imidazolidinone, N-methylacrylamide, tetramethyl urea, N-methyl-2-pyrrolidone, N-methyl-ε-caprolactum, dimethylcarbodiimide, dipropylcarbodiimide, dibutylcarbodiimide, dicyclohexyl carbodiimide, diphenylcarbodiimide, benzaldehyde-N,N-dimetyl hydrazone, benzaldehyde-N,N-diphenyl hydrazone, p-methylbenzaldehyde-N,N-dimethyl hydrazone and p-(N,N-dimethylamoni) benzaldehyde-N,N-dimethyl hydrazone.

* * * * *